(12) United States Patent
Sakaguchi et al.

(10) Patent No.: US 10,176,958 B2
(45) Date of Patent: Jan. 8, 2019

(54) ELECTRODE MATERIAL FOR THERMAL-FUSE MOVABLE ELECTRODE

(71) Applicant: TANAKA KIKINZOKU KOGYO K.K., Tokyo (JP)

(72) Inventors: Osamu Sakaguchi, Gunma (JP); Michiya Takahashi, Gunma (JP); Shinya Adachi, Gunma (JP)

(73) Assignee: TANAKA KIKINZOKU KOGYO K.K., Tokyo (JP)

(*) Notice: Subject to any disclaimer, the term of this patent is extended or adjusted under 35 U.S.C. 154(b) by 742 days.

(21) Appl. No.: 14/389,911

(22) PCT Filed: Apr. 26, 2013

(86) PCT No.: PCT/JP2013/062483
§ 371 (c)(1),
(2) Date: Oct. 1, 2014

(87) PCT Pub. No.: WO2013/168620
PCT Pub. Date: Nov. 14, 2013

(65) Prior Publication Data
US 2015/0054613 A1    Feb. 26, 2015

(30) Foreign Application Priority Data
May 7, 2012 (JP) .................... 2012-106037

(51) Int. Cl.
*H01H 85/143* (2006.01)
*C22C 5/06* (2006.01)
(Continued)

(52) U.S. Cl.
CPC ......... *H01H 85/143* (2013.01); *B32B 15/018* (2013.01); *C22C 1/02* (2013.01);
(Continued)

(58) Field of Classification Search
CPC ................. C22C 5/06; H01H 85/143
(Continued)

(56) References Cited

U.S. PATENT DOCUMENTS

| | | | | |
|---|---|---|---|---|
| 4,523,711 A | * | 6/1985 | Kondo | B23K 1/19 228/198 |
| 2003/0112117 A1 | * | 6/2003 | Miyashita | C22C 5/06 337/407 |

FOREIGN PATENT DOCUMENTS

| | | |
|---|---|---|
| JP | S56-169320 | 12/1981 |
| JP | S62-241211 A | 10/1987 |

(Continued)

*Primary Examiner* — Weiping Zhu
(74) *Attorney, Agent, or Firm* — Roberts & Roberts, LLP

(57) ABSTRACT

The present invention is an electrode material constituting a movable electrode of a thermal fuse, having a five-layer clad structure including a core material layer, an intermediate layer formed on the both sides of the core material layer, and a surface layer formed on the intermediate layer, wherein the core material layer includes Cu, the intermediate layer includes an Ag—Cu-based alloy, the surface layer includes an Ag—CuO-based oxide-dispersed strengthened alloy, and the ratio of the thickness of the intermediate layer to the thickness of the surface layer (intermediate layer/surface layer) is 0.2 or more and 1.0 or less. This electrode material can be manufactured by partially internally oxidizing a three-layer clad material in which plate materials made of an Ag—Cu-based alloy are clad-jointed to both sides of the plate material made of Cu.

20 Claims, 1 Drawing Sheet

(51) Int. Cl.
*C22F 1/14* (2006.01)
*C22C 5/08* (2006.01)
*H01H 1/0237* (2006.01)
*C22C 1/02* (2006.01)
*B32B 15/01* (2006.01)
*C22C 9/00* (2006.01)
*H01H 11/04* (2006.01)
*H01H 37/76* (2006.01)

(52) U.S. Cl.
CPC .................. *C22C 5/06* (2013.01); *C22C 5/08* (2013.01); *C22C 9/00* (2013.01); *C22F 1/14* (2013.01); *H01H 1/0237* (2013.01); *H01H 11/042* (2013.01); *H01H 37/765* (2013.01); *H01H 2011/047* (2013.01)

(58) Field of Classification Search
USPC ......................................................... 337/111
See application file for complete search history.

(56) References Cited

FOREIGN PATENT DOCUMENTS

| | | |
|---|---|---|
| JP | H2-5844 | 1/1990 |
| JP | H2-179369 A | 7/1990 |
| JP | H05-047252 A | 2/1993 |
| JP | 2001-137198 A | 5/2001 |
| JP | 2001-192863 A | 7/2001 |
| JP | 2011-137198 A | 7/2011 |
| WO | 2003/009323 A1 | 1/2003 |

\* cited by examiner

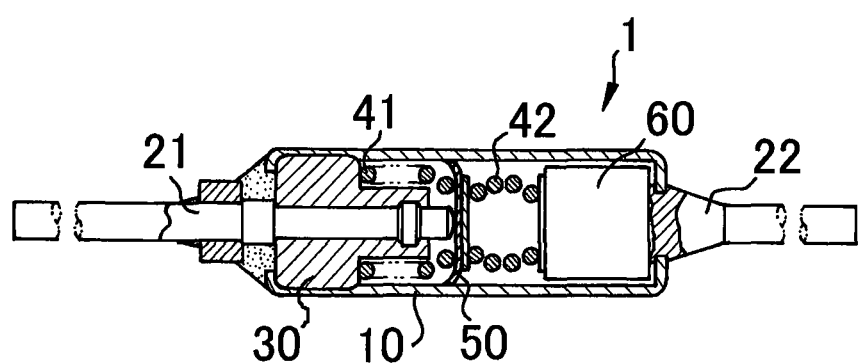

ELECTRODE MATERIAL FOR THERMAL-FUSE MOVABLE ELECTRODE

TECHNICAL FIELD

The present invention relates to an electrode material, especially, a material suitable for a thermal-fuse movable electrode.

BACKGROUND ART

FIG. 1 illustrates a constitution of a general thermal fuse. In thermal fuse 1, lead wires 21 and 22 are connected to case 10 made of a conductive metal, and insulating material 30, springs 41 and 42, movable electrode 50 and fuse element 60 are installed inside the case 10. The spring 41 is disposed between the movable electrode 50 and the insulating material 30, and the spring 42 is disposed between the movable electrode 50 and the fuse element 60. The movable electrode 50 is movable while contacting with the inner surface of the case 10. At normal time (the state of FIG. 1), the thermal fuse is energized from the lead wire 21 to the movable electrode 50 and the case 10, further to the lead wire 22. Then, when the thermal fuse is overheated due to an excess load on the connected electronic device or the like, the fuse element 60 is deformed and melted at a predetermined operating temperature (generally around 240° C.). Thus, the spring 42 is elongated due to unloading, and at the same time, the spring 41 is elongated, whereby the movable electrode 50 moves apart from the lead wire 21. The electric current is cut off by the above operation.

The constituent material of the movable electrode of the thermal fuse having the above operative mechanism is required to have welding resistance on the lead wire and the inner surface of the case, in addition to the conductivity as the electrode material. This is because, the movable electrode is energized in contact with the lead wire constantly, and when welding is generated, it becomes a factor of the operational failure of the thermal fuse. To this request, an Ag—CuO-based oxide-dispersed alloy is known as the constituent material of a conventional movable electrode (Patent Literature 1: hereinafter, this Ag—CuO-based oxide-dispersed alloy is referred to as an Ag—CuO-based alloy).

The Ag—CuO-based alloy is an alloy in which CuO is dispersed in Ag as a matrix, and is excellent in welding resistance and also excellent in high conductivity and stable low contact resistance characteristics, thus has characteristics most required for a movable electrode. Moreover, the application example of the Ag—CuO-based alloy increases also because it does not use Cd that is a harmful substance different from an Ag—CdO-based alloy used before then.

CITATION LIST

Patent Literature

Patent Literature 1: JP 2011-137198 A

SUMMARY OF INVENTION

Technical Problem

Incidentally, the Ag—CuO-based alloy is an alloy mainly composed of Ag (silver), thus can be said as a relatively expensive material. Here, in order to reduce the cost of the movable electrode, thinning in designing can be also considered, but excessive thinning becomes a factor of the operational failure due to the shortage of strength or deterioration of spring property of the movable electrode. Particularly, when the Ag—CuO-based alloy is subjected to heating at the use temperature of the thermal fuse (100° C. or more) for a long time, the Ag matrix tends to soften, thus it can be said that easy cost reduction by thinning is difficult.

Further, welding resistance of the Ag—CuO-based alloy is useful as a movable electrode of a thermal fuse, thus it is not easy to change the material, from the viewpoint of ensuring the reliability of electric devices.

Therefore, the present invention is a material suitable as a constituent material of a movable electrode of a thermal fuse, and an object is to provide a material that is based on the Ag—CuO-based alloy and can reduce its cost, and a method for manufacturing the same.

Solution to Problem

The present inventors have intensively studied for solving the above problems, and decided to apply an electrode material having a clad structure in which a core material layer made of other conductive metal is inserted into an Ag—CuO-based alloy. This is because, the core material layer is set, whereby the use amount of Ag can be reduced to contribute to cost reduction. This is also because, the surface of the electrode material is made of an Ag—CuO-based alloy as a clad structure, whereby welding resistance can be secured.

Moreover, the present inventors have adopted Cu as a conductive metal applicable as a core material layer. This is because Cu is a metal having better conductivity than the Ag—CuO-based alloy and is suitable as a constituent metal of the electrode material. However, Cu is poor in an action of reinforcing the electrode material in strength, and is greatly deteriorated in strength as compared to the Ag—CuO-based alloy, particularly in a high temperature range. Further, since Cu in the Ag—CuO-based alloy is an oxide, the Ag—CuO-based alloy and Cu are basically different materials, and it is also necessary to secure the bonding strength of both layers. Therefore, the present inventors have added an intermediate layer made of an Ag—Cu alloy between the Ag—CuO-based alloy layer on the surface and the Cu layer that is the core material, thereby arriving at the present invention.

More specifically, the invention of the present application that solves the above problems is an electrode material including a movable electrode of a thermal fuse, including a five-layer clad structure including a core material layer, an intermediate layer formed on the both sides of the core material layer, and a surface layer formed on the intermediate layer, wherein the core material layer includes Cu or a Cu alloy, the intermediate layer includes an Ag—Cu-based alloy, the surface layer includes an Ag—CuO-based oxide-dispersed strengthened alloy, and the ratio of the thickness of the intermediate layer to the thickness of the surface layer (intermediate layer/surface layer) is 0.2 or more and 1.0 or less.

The electrode material according to the present invention has a clad structure in which a plurality of metal layers is laminated as described above. Hereinbelow, each metal layer constituting the present invention will be described in detail.

As the Ag—CuO-based alloy of the surface layer, one obtained by internally oxidizing an Ag—Cu alloy containing 3 to 12% by mass of Cu and the balance Ag is preferred. Welding resistance is required for the surface layer of a movable electrode of a thermal fuse, and welding resistance of the Ag—CuO-based alloy varies depending on the amount of the dispersed oxide (CuO), and it depends on the Cu content of the Ag—Cu-based alloy to be internally oxidized. In order to secure preferred welding resistance considering that, the Cu content of the Ag—Cu alloy to be internally oxidized is set to 3 to 12% by mass. Further, as the Ag—CuO-based alloy, one obtained by internally oxidizing an Ag—Cu—Ni alloy containing 3 to 12% by mass of Cu, further 0.03 to 0.7% by mass of Ni and the balance Ag may be used. The significance of Ni addition is to refine CuO particles to improve the strength and welding resistance of the Ag—CuO-based alloy.

The core material layer is made of Cu, and Cu is preferably one having excellent conductivity such as so-called oxygen-free copper (OFC) and a tough pitch copper (TPC). This is for securing conductivity required to the electrode material.

Moreover, setting the intermediate layer between the surface layer made of the Ag—CuO-based alloy and the core material made of Cu is for improving the strength of the electrode material and securing the bonding strength between the surface layer and the core material layer, as described above. An Ag—Cu-based alloy is applied to this intermediate layer. Preferred Ag—Cu-based alloy is either an Ag—Cu alloy containing 3 to 12% by mass of Cu or an Ag—Cu—Ni alloy containing 3 to 12% by mass of Cu and 0.03 to 0.7% by mass of Ni. The intermediate layer is a metal layer for securing the strength and spring property of the electrode material, and Cu is added to Ag in the range capable of functioning as the object and the electrode material. Moreover, considering the bondability on the surface layer, the composition similar to the surface layer is set.

The Ag—Cu-based alloy (Ag—Cu alloy or Ag—Cu—Ni alloy) that is the intermediate layer is an alloy in which Cu (Ni) forms a solid solution with Ag, is excellent in strength than Ag that is the matrix of the Ag—CuO-based alloy, and also causes small reduction in strength in a high temperature range. Therefore, the Ag—Cu-based alloy can function as a reinforcing layer of the electrode material. In addition, the Ag—Cu alloy and the Ag—Cu—Ni alloy have the composition similar to the Ag—CuO-based alloy that is the surface layer, and also have good affinity to Cu that is the core material layer since it does not have a dispersion layer, thus also have the action of improving the bondability between the surface layer and the core material layer.

Moreover, regarding the thickness of the surface layer and the intermediate layer, the ratio of the thickness of the intermediate layer to the thickness of the surface layer (intermediate layer/surface layer) is set to 0.2 or more and 1.0 or less. The reason for setting the thickness ratio at 0.2 or more is to ensure reduction in strength due to an insertion of the copper layer and securing the strength equal or higher than a conventional electrode material of a monolayer of an Ag—CuO-based alloy. On the other hand, the reason for setting the thickness ratio at 1.0 or less is to prevent deterioration of welding resistance caused by wasting of the surface layer due to arc discharge generated when the thermal fuse is operated and exposure of a base intermediate layer, while reduction of the thickness of the surface layer contributes to improvement in strength. Here, the thickness of the surface layer is preferably 15 µm or more.

It is preferred that the Ag—CuO-based alloy layer that is the surface layer and the Ag—Cu-based alloy layer that is the intermediate layer are integrated while having the above ratio of the thickness. Here, the Ag—CuO-based alloy is manufactured by internally oxidizing the Ag—Cu-based alloy, thus, as the surface layer and the intermediate layer, those formed by partially internally oxidizing a monolayer plate material made of the Ag—Cu-based alloy are preferred. As described above, the surface layer and the intermediate layer become continuous by using the partially (only surface) internally oxidized Ag—Cu-based alloy.

Next, the method for manufacturing the electrode material according to the present invention will be described. The electrode material according to the present invention is a clad material, thus a plate material that constitutes each metal layer, and a foil material or a tape material are stacked and rolled to be jointed, whereby the materials can be formed into a clad material. More specifically, the electrode material can be manufactured by stacking and rolling plate materials made of an Ag—CuO-based alloy, an Ag—Cu alloy (an Ag—Cu—Ni alloy), Cu or Cu alloy and the like. The Ag—CuO-based alloy can be manufactured by internally oxidizing an Ag—Cu alloy or an Ag—Cu—Ni alloy.

Here, since the Ag—CuO-based alloy can be manufactured by internal oxidation of the Ag—Cu-based alloy, an electrode material can be manufactured more efficiently than separately manufacturing the plate material constituting each metal layer and the like as described above. More specifically, preferred manufacturing method is a method for manufacturing an electrode material including the steps of jointing a plate material made of an Ag—Cu-based alloy to the both sides of the plate material made of Cu to form a clad material, and heat-treating the clad material to internally oxidize a part of the plate material made of an Ag—Cu-based alloy to form a surface layer made of the Ag—CuO-based oxide-dispersed strengthened alloy. As described above, a three-layer (Ag—Cu-based alloy/Cu/Ag—Cu-based alloy) clad material is previously manufactured, and the Ag—Cu-based alloy layer thereof is partially internally oxidized, whereby the manufacturing process can be simplified, and the surface layer and the intermediate layer can be integrated. The thickness of the Ag—CuO-based alloy layer to be a surface layer can be adjusted in the conditions of internal oxidation treatment set forth below, and an electrode material with an objective structure can be manufactured without making oxygen reach the core material layer (Cu) in the treatment.

In the preferred manufacturing method described above, first, plate materials made of an Ag—Cu alloy (Ag—Cu—Ni alloy) are stacked and rolled to be jointed to the both sides of the core material made of Cu to manufacture a clad material. The thickness of the clad-jointed plate material may be adjusted by rolling it or the like before internal oxidation treatment.

The clad material manufactured above is internally oxidized to form an Ag—CuO-based alloy layer. As the conditions of internal oxidation treatment, the heat treatment temperature is preferably set at 500 to 700° C. At a heat treatment temperature of less than 500° C., oxygen atoms are not enough diffused into the Ag—Cu-based alloy, and it takes quite a long time to oxidize a range of a certain level or more depth from the surface of alloy, thus it is not practical. On the other hand, at a heat treatment temperature exceeding 700° C., the rate of the progression of internal oxidation is too high, thus it becomes difficult to control the thickness of the surface layer.

The oxygen partial pressure is preferably set at 0.01 MPa or more and less than 0.3 MPa. At an oxygen partial pressure of less than 0.01 MPa, it is difficult to supply the amount of oxygen necessary for enough internal oxidation into the Ag—Cu-based alloy. On the other hand, at an oxygen partial pressure of 0.3 MPa or more, the rate of the progression of internal oxidation is too high, thus it becomes difficult to control the thickness of the surface layer, as in the case of raising the heat treatment temperature as described above.

The heat treatment time is preferably set at 3 to 15 hours. The thickness of the surface layer is controlled by heat treatment temperature, oxygen partial pressure and heat treatment time. When the heat treatment time is short, a predetermined thickness of the surface layer is not obtained, and when the heat treatment time is too long, the intermediate layer is thinned and causes deterioration of strength. In addition, when oxidation reaches an interface between the intermediate layer and the core material layer, the core material layer is oxidized to markedly deteriorate the bonding strength between the intermediate layer and the core material layer.

The internal oxidation conditions described above are adjusted, whereby the Ag—CuO-based alloy layer can be formed, and a five-layer structure electrode material can be manufactured. The clad material manufactured as described above may be thereafter rolled to adjust the total thickness, as necessary. Moreover, the clad material can be subjected to cutting processing, slit processing and bend processing into a shape and dimension required as a movable electrode of a thermal fuse.

Advantageous Effects of Invention

The electrode material according to the present invention is suitable for a movable electrode of a thermal fuse, and the material cost can be reduced by combining Cu to an Ag—CuO-based alloy to form a clad material. In addition, by setting an intermediate layer, contact with the case of the thermal fuse can be stably maintained without degrading the strength and spring property even under heating. The present invention has an Ag—CuO-based alloy in the surface layer, and also has good welding resistance originally required for the movable electrode.

BRIEF DESCRIPTION OF DRAWINGS

FIG. 1 illustrates a structure of a general thermal fuse.

DESCRIPTION OF EMBODIMENTS

Hereinbelow, preferred examples of the present invention will be described. In the present embodiments, an electrode material having a five-layer clad structure applying Cu as a core material layer and forming an Ag—Cu alloy (Cu content: 10% by mass) on both sides of this core material layer as intermediate layers, and an Ag—CuO alloy (Cu content: 10% by mass (12% by mass in terms of CuO)) as surface layers were manufactured, and the characteristics were evaluated.

EXAMPLE 1

First, each metal was weighed so as to have an alloy composition of 90.0% by mass of Ag, 10.0% by mass of Cu, and an Ag—Cu alloy was melted and cast. Thereafter, an Ag—Cu alloy ingot was rolled to a thickness of 4.15 mm and cut to manufacture an Ag—Cu alloy plate with a width of 115 mm and a length of 195 mm. Moreover, an oxygen-free copper ingot was rolled to manufacture a Cu plate with a width of 120 mm, a length of 200 mm and a thickness of 9 mm, and the above Ag—Cu alloy plate was stacked on both sides of this Cu plate. After cold crimping at a pressure of 150 t, the laminate was maintained at 800° C. for 60 minutes in a mixed gas of nitrogen and hydrogen, and then hot crimped at a pressure of 100 ton. The crimped three-layer (Ag—Cu alloy/Cu/Ag—Cu alloy) clad material was subjected to rolling processing to manufacture a clad material tape.

Next, the clad material tape described above was rolled to 450 μm, to be a three-layer clad material tape made of an Ag—Cu alloy layer with a thickness of 110 μm and a core material layer with a thickness of 230 μm. The ratio of the thickness of the Ag—Cu alloy layer to the core material layer was almost the same as the ratio of the thickness of the Ag—Cu alloy plate to the Cu plate before crimped. This three-layer clad material tape was internally oxidized to form an Ag—CuO alloy layer as a surface layer. The internal oxidation treatment was carried out in an internal oxidation furnace in the conditions of a heat treatment temperature of 600° C., an oxygen partial pressure of 0.02 MPa, and a heat treatment time of 8 hours. According to the internal oxidation treatment, an Ag—CuO alloy layer with a thickness of 70 μm and an Ag—Cu alloy layer with a thickness of 40 μm were formed. Moreover, the internally oxidized alloy plate was further rolled to manufacture a clad material tape with a five-layer structure. The manufactured clad material tape has a total thickness of 89 μm of Ag—CuO (15 μm)/Ag—Cu (7 μm)/Cu (45 μm)/Ag—Cu (7 μm)/Ag—CuO (15 μm). The resulting clad material tape was cut to make an electrode material for evaluation with a dimension of 7 mm in width and 50 mm in length. The thickness of each layer was measured from cross-sectional observation with a metallurgical microscope.

EXAMPLE 2

In Example 1, in the internal oxidation of the three-layer clad material (Ag—Cu alloy/Cu/Ag—Cu alloy), the heat treatment time was set at 10 hours, thereby forming an Ag—CuO alloy layer with a thickness of 91 μm and an Ag—Cu alloy layer with a thickness of 19 μm. Thereafter, the resulting alloy plate was rolled in the same manner as in Example 1 to manufacture a clad material tape with a five-layer structure. The manufactured clad material tape has a total thickness of 89 μm of Ag—CuO (18.3 μm)/Ag—Cu (3.7 μm)/Cu (45 μm)/Ag—Cu (3.7 μm)/Ag—CuO (18.3 μm). The resulting clad material tape was cut to make an electrode material for evaluation.

EXAMPLE 3

In Example 1, in the internal oxidation of the three-layer clad material (Ag—Cu alloy/Cu/Ag—Cu alloy), the heat treatment time was set at 3 hours, thereby forming an Ag—CuO alloy layer with a thickness of 55 μm and an Ag—Cu alloy layer with a thickness of 55 μm. Thereafter, the resulting alloy plate was rolled in the same manner as in Example 1 to manufacture a clad material tape with a five-layer structure. The manufactured clad material tape has a total thickness of 89 μm of Ag—CuO (11 μm)/Ag—Cu (11 μm)/Cu (45 μm)/Ag—Cu (11 μm)/Ag—CuO (11 μm). The resulting clad material tape was cut to make an electrode material for evaluation.

COMPARATIVE EXAMPLE

In Example 1, in the internal oxidation of the three-layer clad material (Ag—Cu alloy/Cu/Ag—Cu alloy), the heat treatment time was set at 12 hours, thereby forming an Ag—CuO alloy layer with a thickness of 100 μm and an Ag—Cu alloy layer with a thickness of 10 μm. Thereafter, the resulting alloy plate was rolled in the same manner as in Example 1 to manufacture a clad material tape with a five-layer structure. The manufactured clad material tape has a total thickness of 89 μm of Ag—CuO (20 μm)/Ag—Cu (2 μm)/Cu (45 μm)/Ag—Cu (2 μm)/Ag—CuO (20 μm). The resulting clad material tape was cut to make an electrode material for evaluation.

CONVENTIONAL EXAMPLE AND REFERENCE EXAMPLE

The Ag—Cu alloy plate manufactured in Example 1 was rolled to 450 μm, and the internal oxidation was carried out at a heat treatment temperature of 740° C., an oxygen partial pressure of 0.5 MPa, and a heat treatment time of 48 hours to form an Ag—CuO alloy (monolayer) as whole. This Ag—CuO alloy was further rolled to form a tape material of 89 μm (conventional example). In addition, an oxygen-free copper in Example 1 was rolled to form a tape material of 89 μm (reference example).

For each electrode material of Examples 1 to 3, comparative example, conventional example and reference example manufactured as described above, the spring deflection limit was measured according to a spring deflection limit test to evaluate spring property. The results are shown in Table 1.

TABLE 1

| | Thickness of Each Layer | | | | |
|---|---|---|---|---|---|
| | Ag—CuO (Surface Layer) | Ag—Cu (Intermediate Layer) | Cu (Core Material Layer) | Intermediate Layer/Surface Layer | Spring Deflection Limit |
| Example 1 | 15 μm | 7 μm | 45 μm | 0.47 | 227N/mm² |
| Example 2 | 18.3 μm | 3.7 μm | 45 μm | 0.2 | 215N/mm² |
| Example 3 | 11 μm | 11 μm | 45 μm | 1.0 | 244N/mm² |
| Comparative Example | 20 μm | 2 μm | 45 μm | 0.1 | 205N/mm² |
| Conventional Example | 89 μm (Monolayer) | — | — | —(0) | 206N/mm² |
| Reference Example | — | — | 89 μm (Monolayer) | — | 188N/mm² |

Based on the results of Examples 1 to 3, as the thickness of the Ag—Cu alloy layer that is the intermediate layer increases (the ratio increases), the spring deflection limit tends to increase. In this regard, comparative example has a thin intermediate layer (intermediate layer/surface layer: 0.1) and has the same strength as the Ag—CuO alloy pure material that is a conventional example. In the present invention, the introduction of a copper layer that is the core material layer aims for cost reduction through the reduction of the use amount of Ag. However, in terms of strength, the Ag—Cu alloy layer is set to 0.2 times or more based on the surface layer, whereby enough strength can be obtained.

In addition, for each electrode material of Example 1, conventional example and reference example, the conductivity (% IACS) was measured to evaluate conductivity. As the measurement of conductivity, each electrode material with a thickness of 89 μm was cut into 7 mm in width and 150 mm in length, then a current terminal was clamped at both ends thereof and a voltage terminal was clamped between 100 mm inside thereof to measure electrical resistance, and IACS was calculated. The measurement results are shown in Table 2.

TABLE 2

| | Thickness of Each Layer | | | |
|---|---|---|---|---|
| | Ag—CuO (Surface Layer) | Ag—Cu (Intermediate Layer) | Cu (Core Material Layer) | Conductivity (IACS/%) |
| Example 1 | 15 μm | 7 μm | 45 μm | 96 |
| Conventional Example | 89 μm (Monolayer) | — | — | 75 |
| Reference Example | — | — | 89 μm (Monolayer) | 101 |

It can be seen from the results in Table 2 that Cu having conductivity higher than the Ag—CuO-based alloy is used as a core material layer as in Example 1, whereby showing conductivity higher than a conventional Ag—CuO-based alloy monolayer material. The conductivity of Example 1 is a characteristic close to the electrode material of a copper layer monolayer.

INDUSTRIAL APPLICABILITY

The present invention is an electrode material that adopts a clad structure in which an Ag—Cu alloy layer of an intermediate layer is set while using a copper layer as a core material, thereby being excellent in conductivity, and being capable of satisfying both cost and strength, and is suitable for a movable electrode of a thermal fuse. In addition, the thickness of the intermediate layer is set to the proper range, whereby the electrode material is also excellent in welding resistance of the Ag—CuO alloy of a surface layer. According to the present invention, the operational failure of the thermal fuse can be suppressed, and reliability of various electric devices can be ensured.

The invention claimed is:

1. An electrode material constituting a movable electrode of a thermal fuse, comprising:
a five-layer clad structure comprising
a core material layer comprising Cu,
an intermediate layer comprising an Ag—Cu-based alloy formed on the both sides of the core material layer, and
a surface layer comprising an Ag—CuO-based oxide-dispersed strengthened alloy formed on each intermediate layer,
wherein the Ag—Cu-based alloy as an intermediate layer does not have a dispersion layer,
the ratio of the thickness of the intermediate layer to the thickness of the surface layer is 0.2 or more and 1.0 or less, and the thickness of the surface layer comprising an Ag—CuO-based oxide-dispersed strengthened alloy is 15 µm or more.

2. The electrode material according to claim 1, wherein the Ag—CuO-based oxide-dispersed strengthened alloy constituting each surface layer is obtained by internally oxidizing either an Ag—Cu alloy of 3 to 12% by mass of Cu and the balance Ag or an Ag—Cu—Ni alloy of 3 to 12% by mass of Cu, 0.03 to 0.7% by mass of Ni and the balance Ag.

3. The electrode material according to claim 2, wherein the Ag—Cu-based alloy constituting each intermediate layer comprises either an Ag—Cu alloy of 3 to 12% by mass of Cu and the balance Ag or an Ag—Cu—Ni alloy of 3 to 12% by mass of Cu, 0.03 to 0.7% by mass of Ni and the balance Ag.

4. The electrode material according to claim 3, wherein Cu constituting the core material layer is either an oxygen-free copper or a tough pitch copper.

5. The electrode material according to claim 4, wherein the surface layer is formed by partially internally oxidizing a monolayer plate material comprising an Ag—Cu-based alloy.

6. The electrode material according to claim 3, wherein the surface layer is formed by partially internally oxidizing a monolayer plate material comprising an Ag—Cu-based alloy.

7. The electrode material according to claim 2, wherein Cu constituting the core material layer is either an oxygen-free copper or a tough pitch copper.

8. The electrode material according to claim 7, wherein the surface layer is formed by partially internally oxidizing a monolayer plate material comprising an Ag—Cu-based alloy.

9. The electrode material according to claim 2, wherein the surface layer is formed by partially internally oxidizing a monolayer plate material comprising an Ag—Cu-based alloy.

10. The electrode material according to claim 1, wherein the Ag—Cu-based alloy constituting each intermediate layer comprises either an Ag—Cu alloy of 3 to 12% by mass of Cu and the balance Ag or an Ag—Cu—Ni alloy of 3 to 12% by mass of Cu, 0.03 to 0.7% by mass of Ni and the balance Ag.

11. The electrode material according to claim 10, wherein Cu constituting the core material layer is either an oxygen-free copper or a tough pitch copper.

12. The electrode material according to claim 11, wherein the surface layer is formed by partially internally oxidizing a monolayer plate material comprising an Ag—Cu-based alloy.

13. The electrode material according to claim 10, wherein the surface layer is formed by partially internally oxidizing a monolayer plate material comprising an Ag—Cu-based alloy.

14. The electrode material according to claim 1, wherein Cu constituting the core material layer is either an oxygen-free copper or a tough pitch copper.

15. The electrode material according to claim 14, wherein the surface layer is formed by partially internally oxidizing a monolayer plate material comprising an Ag—Cu-based alloy.

16. The electrode material according to claim 1, wherein the surface layer is formed by partially internally oxidizing a monolayer plate material comprising an Ag—Cu-based alloy.

17. A method for manufacturing the electrode material as defined in claim 1 comprising the steps of:
jointing an intermediate layer plate material comprising an Ag—Cu-based alloy to both sides of a core material layer comprising Cu to form a clad material; and
heat-treating the clad material to internally oxidize a part of the intermediate layer plate material comprising an Ag—Cu-based alloy to form a surface layer comprising an Ag—CuO-based oxide-dispersed strengthened alloy.

18. The method for manufacturing the electrode material according to claim 17, wherein heat-treating the clad material is performed at a heat-treating temperature of 500 to 700° C., an oxygen partial pressure of 0.01 MPa to 0.3 MPa, and a heat-treating time of 3 to 15 hours.

19. The method of claim 17, wherein the Ag—CuO-based oxide-dispersed strengthened alloy constituting each surface layer is obtained by internally oxidizing either an Ag—Cu alloy of 3 to 12% by mass of Cu and the balance Ag or an Ag—Cu—Ni alloy of 3 to 12% by mass of Cu, 0.03 to 0.7% by mass of Ni and the balance Ag.

20. The electrode material according to claim 17, wherein the Ag—Cu-based alloy constituting each intermediate layer comprises either an Ag—Cu alloy of 3 to 12% by mass of Cu and the balance Ag or an Ag—Cu—Ni alloy of 3 to 12% by mass of Cu, 0.03 to 0.7% by mass of Ni and the balance Ag.

\* \* \* \* \*